March 28, 1944.   L. LARSON   2,345,346
TIRE REMOVING DEVICE
Filed July 24, 1941   2 Sheets-Sheet 1
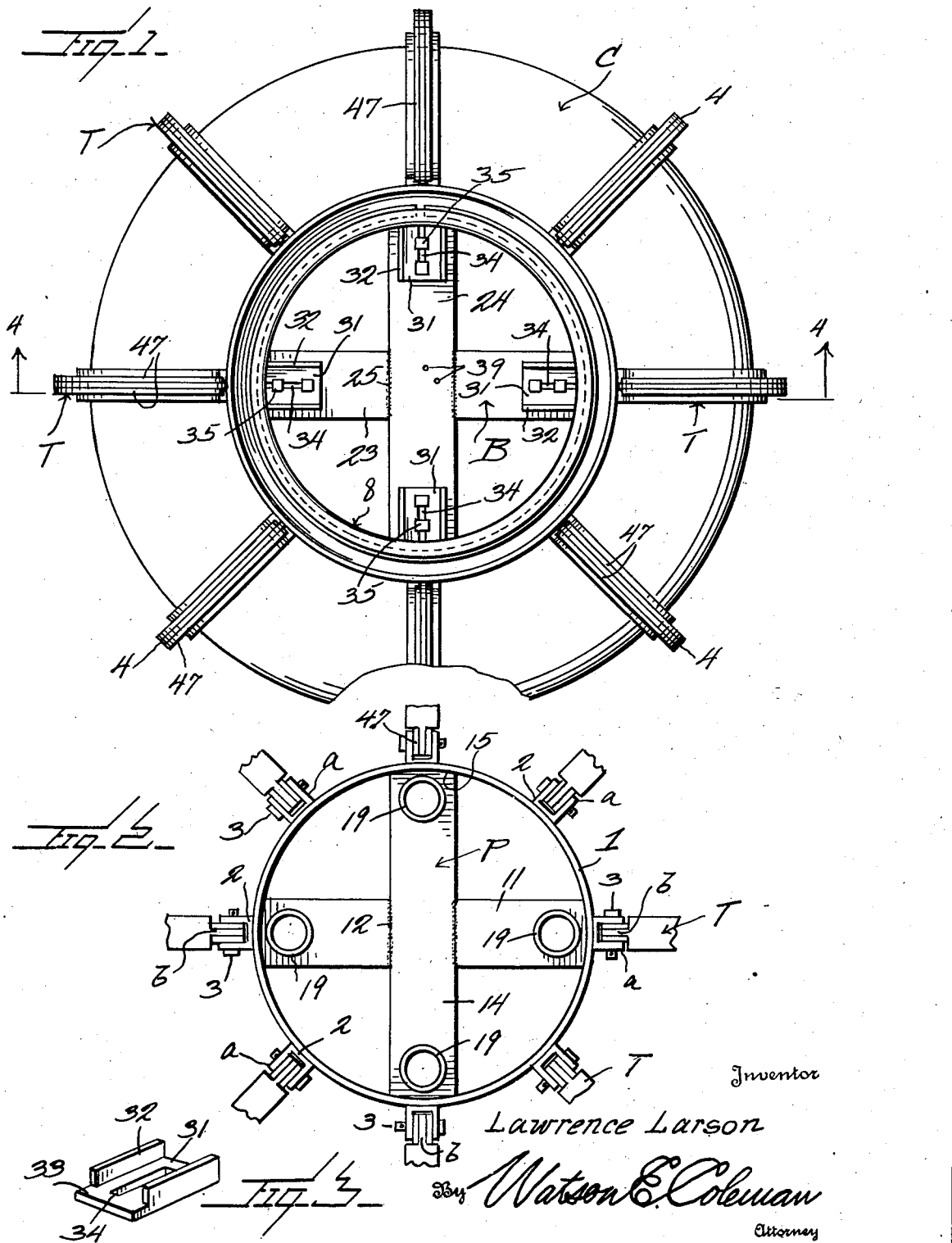
Inventor
Lawrence Larson
By Watson E. Coleman
Attorney March 28, 1944.    L. LARSON    2,345,346
TIRE REMOVING DEVICE
Filed July 24, 1941    2 Sheets-Sheet 2
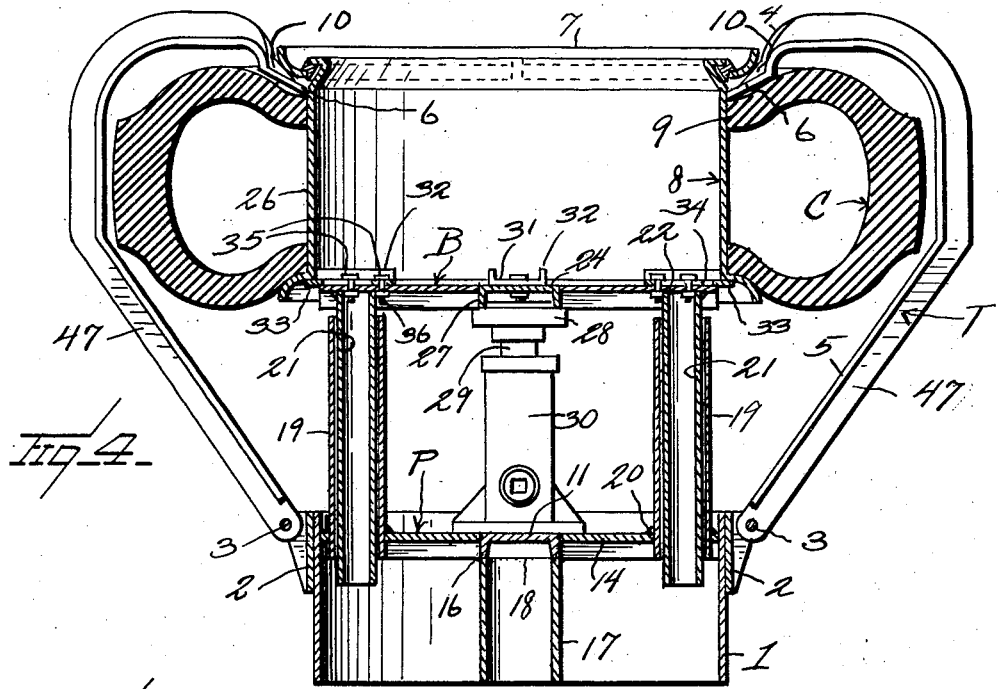
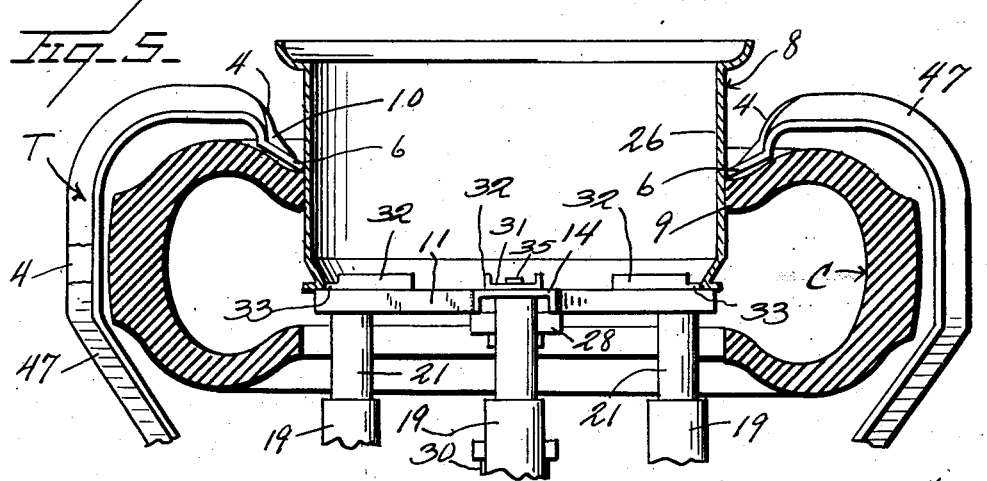
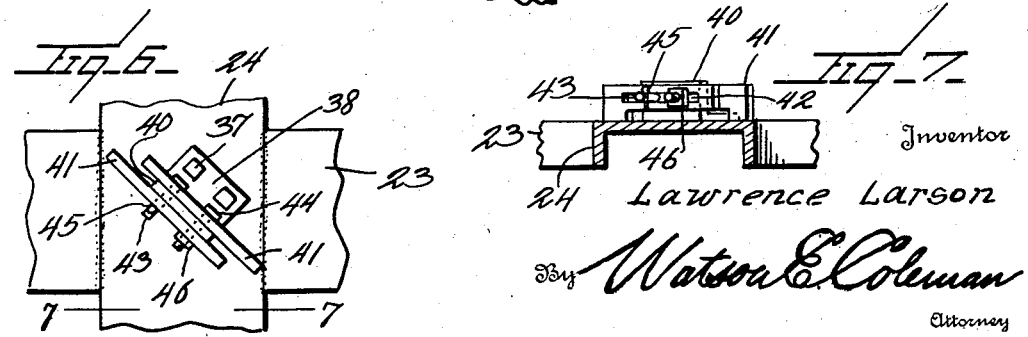
Inventor
Lawrence Larson
By Watson E. Coleman
Attorney Patented Mar. 28, 1944

2,345,346

UNITED STATES PATENT OFFICE 2,345,346

TIRE REMOVING DEVICE

Lawrence Larson, La Crosse, Wis., assignor to Gateway City Transfer Company, Inc., La Crosse, Wis., a corporation of Wisconsin Application July 24, 1941, Serial No. 403,909

1 Claim. (Cl. 157—6)

This invention relates to a device for removing tires, and it is a particular object of the invention to provide a device of this kind to facilitate removing truck and bus tires and side and lock rings, and more particularly when said parts are held tight to the wheel rim due to rust or when the rubber within the beads of a tire adheres to the rim from heat generated while the wheel is in service or heat generated from the brakes.

In the servicing of trucks and buses it is often found that the rubber of the tires, together with the rust on the rims, form welts on the rim, resulting in an increased rim circle from which, in many instances, it is very difficult and often impossible to force off the tire by the use of the conventional heavy hammers and tire irons.

It is another object of the invention to provide a device to facilitate the removal of a tire under such adverse conditions.

It is also an object of the invention to provide a device of this kind which can be employed in the removal of a tire and lock ring in a manner avoiding distortion of the lock ring which would result in improper fitting of the ring to the rim when reapplied.

A still further object of the invention is to provide a device of this kind which can be conveniently employed in the removal of a tire in a manner whereby is substantially eliminated the liability of materially damaging a bead of the tire, such as often occurs with the use of a tire iron or the conventional heavy hammer.

The invention consists in the details of construction and in the combination and arrangement of the several parts of my improved tire removing device whereby certain important advantages are attained, as will be hereinafter more fully set forth.

In order that my invention may be the better understood, I will now proceed to describe the same with reference to the accompanying drawings, wherein—

Figure 1 is a view in top plan of a tire removing device constructed in accordance with an embodiment of my invention, the wheel rim and associated tire being in initial position thereon;

Figure 2 is a fragmentary view in top plan of the base member of the device as herein embodied;

Figure 3 is a view in perspective of one of the rim stoppers or supports as herein embodied and unapplied;

Figure 4 is a vertical sectional view taken substantially on the line 4—4 of Figure 1, with certain of the parts in elevation;

Figure 5 is a fragmentary view in vertical section and somewhat similar to Figure 4, with certain of the parts in a second position;

Figure 6 is a fragmentary view in top plan of an embodiment of the invention comprising an adjustable guide to fit within different size hubs; and Figure 7 is a fragmentary sectional view taken on the line 7—7 of Figure 6.

As illustrated in the accompanying drawings, 1 denotes an annular and tubular base member of desired height and radius. This member 1 has welded or otherwise rigidly secured to its upper marginal portion the exteriorly arranged brackets 2. These brackets 2 are equi-distantly spaced around the base member 1 and each of such brackets includes the outstanding spaced arms a between which is pivotally held, by a pin 3 or the like, an end portion of a tire hook T. As herein disclosed, this tire hook T is of T-formation from substantially one end to the other, except that the pivoted end b of the web 4 of the hook extends slightly beyond the adjacent end of the head plate 5. The outer end portion of the hook member T is formed to readily engage over a tire carcass C, as illustrated in Figures 4 and 5 of the drawings, and the outer or free extremity of the head plate 5 is formed to provide an outwardly and angularly disposed penetrating member 6 which is adapted to be inserted between a conventional lock ring 7 on the wheel or tire rim 8 between said ring 7 and the adjacent bead 9 of the tire carcass or casing C. The web 4 of the hook T also terminates slightly inward of the outer or free end of the penetrating member 6 with the adjacent portion 10 of said web 4 constituting a wedge member whereby is facilitated the desired separation of the adjacent bead 9 of the tire casing or carcass C from the ring 7 which might otherwise be tightly held together as a result of rust or undue heating of the rubber within the carcass or casing C.

Arranged within the upper portion of the base member 1 is a platform P, herein disclosed as comprising four flat arms radiating from a common center with certain of the arms 11 having their inner end portions welded, as at 12, or otherwise rigidly secured to the central portion of an elongated flat arm 14 of a length equal to the internal diameter of the base member 1. The outer extremities of these arms 11 and 14 are welded, as at 15, to the inner face of the base member 1, whereby the platform P is rigidly mounted within the base member 1. The central portion of the arm 14 has depending therefrom an annular flange 16 of a diameter substantially equal to the width of the plate 14, and this flange 16 has contact with the upper end of a tubular support 17, and is welded, as at 18, or otherwise firmly secured thereto. This support 17 is of a length to have its lower end coplanar with the lower edge of the base member 1 and this support 17 serves to resist pressure imposed upon the arms 11 and 14 when the device is in use, it being understood that the base member 1 and support 17 will be resting upon a suitable supporting foundation. The outer end portions of the arms 11 and 14 carry the upstanding tubular members 19 open at both ends, and, as herein comprised, having their upper ends substantially coplanar. These members 19 have their lower end portions extending through the arms 11 and 14 and are welded, as at 20, or otherwise rigidly secured to the arms 11 and 14. The members 19 serve as guides for the elongated members 21 freely extending from above within the members 19 and having their upper end portions welded, as at 22, or otherwise firmly secured to the outer end portions of the arms 23 and 24 of an upper platform B. The arms 23 have their inner ends welded, as at 25, to the central portion of the elongated arm 24. The arms 23 and 24 are flat with the arms 23 in right angular relation to the arm 24. The arms 23 and 24 are of such lengths as to have their outer ends closely approach the tread portion 26 of the rim 8 from which it is desired to remove an applied tire casing or carcass C.

The central portion of the arm 24 is provided with a depending annular flange 27 of a diameter substantially equal to the width of the arm 24. This annular flange 27 is adapted to be engaged by the head 28 carried by the outer end portion of the plunger 29 of a jack 30 positioned upon the central portion of the platform P. The jack 30 may be hydraulic or of any other type desired.

The outer end portions of the arms 23 and 24 each have mounted thereon a rim stopper and support 31. This stopper and support 31, as herein disclosed, constitutes a flat plate having its rear marginal portions provided with the upstanding strengthening flanges 32 which terminate a desired distance inwardly of the outer end of the plate, whereby is provided a lip 33 to engage below the tread 26 of the rim member 8. The central portion of the plate 31 is provided with the longitudinally disposed slot 34 through which are directed the holding bolts 35 which are also directed through the adjacent portion of an arm 23 or 24, whereby means are provided for holding the plate 31 in selected readily adjusted positions, as may be required in accordance with the size of the rim 8. The bolts 35 have coacting therewith the usual holding nuts 36.

In practice, when it is desired to remove a tire casing or carcass C from its rim 8, the said assembled rim 8 and casing or carcass C is placed upon the upper platform B, as illustrated in Figure 4, with the penetrating members 6 extending between the lock ring 7 and the adjacent bead 9 of the carcass C. Upon operating the jack 30 the rim 8 will be forced upwardly in a manner to assure separation of the lock ring 7 from the adjacent bead 9 of the carcass C, and more particularly when said ring 7 and adjacent bead 9 are tightly held together by rust or as a result of undue heating of the bead 9. After this separation of the ring 7, said ring 7 is removed and the rim 8 and applied carcass C are again placed upon the upper platform B, but in a position reverse to that as illustrated in Figure 4, and as is set forth in Figure 5 of the drawings. The jack 30 is then operated to press the rim 8 outwardly and out from within the casing or carcass C.

When the device as herein disclosed is employed in connection with a wheel wherein the rim forms a part of the wheel structure, the rim stoppers and supports 31 are removed, and there is bolted to the central portion of the arm 24, by the bolts 37, a plate 38. The central part of the arm 24 is provided with the suitably positioned openings 39 to allow for the placing of this plate 38 when it is desired to use the same. This plate is provided with an upstanding flange 40, and to the opposite sides of which are arranged the centering plates 41. Each of these plates 41 is provided with a slot 42 disposed lengthwise thereof, with the slot 42 of one plate 41 being in register with the slot 42 of the second plate 41. The flange 40 has disposed therethrough the headed shanks 43 and 44 which are also directed through the slots 42 of the plates 41. The shank 43 has disposed therethrough a holding pin 45, while the shank 44 has threaded thereon a clamping nut 46 whereby the plates 41 are held in desired selective adjustment, dependent upon the diameter of the wheel hub. These plates 41 engage within the hub of the wheel to facilitate the operation of removing the tire carcass from the rim carried by the wheel. In this operation the upper platform B, or more particularly the arms 23 and 24 thereof, have contact with the spokes of the wheel.

Each of the tire hooks T has welded to the opposite faces of its web 4 reinforcing strips 47 which extend from the pivoted extremity of said web to a point closely adjacent to the penetrating member 6 at the opposite extremity thereof.

From the foregoing description it is thought to be obvious that a tire removing device constructed in accordance with my invention is particularly well adapted for use by reason of the convenience and facility with which it may be assembled and operated.

I claim:

A device for removing a tire carcass from a rim including a tubular base, a platform arranged within and carried by the base at the upper portion thereof, a support depending from the central portion of the platform and having its lower end substantially co-planar with the lower end of the base, upstanding guide members carried by the platform adjacent to the base and spaced circumferentially around the platform, a second platform above the first platform, elongated depending members carried by the second platform and having telescoping engagement with the guide members, a plurality of tire engaging hooks pivoted to the upper marginal portion of the base and adapted to swing across the edge of the first platform, a thrust unit positioned between the platforms for forcing the second platform away from the first platform, said unit having only pressing engagement with the two platforms whereby the unit may be slipped into and out of working position between the platforms, flat rim-supporting plates carried by the second platform at spaced points thereon for adjustment radially of said second platform, each of said plates having a slot, and means for holding each of the plates to the second platform in selected radial adjustment.

LAWRENCE LARSON.